United States Patent
Li et al.

(10) Patent No.: US 8,879,905 B2
(45) Date of Patent: *Nov. 4, 2014

(54) PERFORMANCE MONITORING IN PASSIVE OPTICAL NETWORKS

(71) Applicant: Broadcom Corporation, Irvine, CA (US)

(72) Inventors: Weidong Rick Li, Saratoga, CA (US); Jaroslaw Wojtowicz, Santa Rosa, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,089

(22) Filed: May 13, 2013

(65) Prior Publication Data

US 2013/0251362 A1    Sep. 26, 2013

Related U.S. Application Data

(63) Continuation of application No. 12/579,209, filed on Oct. 14, 2009, now Pat. No. 8,442,398.

(60) Provisional application No. 61/107,255, filed on Oct. 21, 2008.

(51) Int. Cl.
| | |
|---|---|
| *H04B 10/08* | (2006.01) |
| *H04B 10/079* | (2013.01) |
| *H04B 10/07* | (2013.01) |
| *H04J 3/16* | (2006.01) |

(52) U.S. Cl.
CPC ............ *H04B 10/07* (2013.01); *H04B 10/0795* (2013.01); *H04J 3/1694* (2013.01)
USPC ................... 398/16; 398/30; 398/33; 398/36; 398/38; 398/58; 398/63

(58) Field of Classification Search
USPC .......................... 398/16, 30, 33, 36, 38, 58, 63
See application file for complete search history.

(56) References Cited

U.S. PATENT DOCUMENTS

| | | | |
|---|---|---|---|
| 6,108,112 A | 8/2000 | Touma | |
| 7,555,214 B2 * | 6/2009 | Khermosh | 398/27 |

(Continued)

FOREIGN PATENT DOCUMENTS

| | | | | |
|---|---|---|---|---|
| WO | WO 2004/056025 A2 | | 7/2004 | |
| WO | WO 2008/031328 | * | 3/2008 | H04B 10/08 |

OTHER PUBLICATIONS

International Search Report directed to related International Application No. PCT/US2009/060899, Korean Intellectual Property Office, Daejeon, Republic of Korea, mailed May 20, 2012; 3 pages.

(Continued)

*Primary Examiner* — Li Liu
(74) *Attorney, Agent, or Firm* — Sterne, Kessler, Goldstein & Fox PLLC

(57) ABSTRACT

One embodiment provides a system for performance monitoring in a passive optic network (PON). The system includes an optical line terminal (OLT) and an optical network unit (ONU). The OLT includes an optical transceiver configured to transmit optical signals to and receive optical signals from the ONU, and a performance monitoring mechanism configured to monitor performance of the PON based on received optical signals.

19 Claims, 11 Drawing Sheets

(56) References Cited

U.S. PATENT DOCUMENTS

| | | | |
|---|---|---|---|
| 7,840,135 B2 | 11/2010 | Zhao et al. | |
| 8,442,398 B2 * | 5/2013 | Li et al. | 398/16 |
| 2005/0058135 A1 | 3/2005 | Sisto et al. | |
| 2005/0158048 A1 * | 7/2005 | Sung et al. | 398/66 |
| 2006/0133806 A1 | 6/2006 | Krimmel | |
| 2007/0116467 A1 | 5/2007 | Kwon et al. | |
| 2007/0140689 A1 | 6/2007 | Haran | |
| 2007/0143645 A1 * | 6/2007 | Haran | 714/704 |
| 2008/0044185 A1 | 2/2008 | Lee et al. | |
| 2008/0138064 A1 * | 6/2008 | O'Byrne et al. | 398/25 |
| 2008/0232819 A1 | 9/2008 | Mukai | |
| 2009/0245781 A1 * | 10/2009 | Qi et al. | 398/1 |

OTHER PUBLICATIONS

International Preliminary Report on Patentability and Written Opinion directed to related International Application No. PCT/US2009/060899, The International Bureau of WIPO, Geneva, Switzerland, mailed Apr. 26, 2011; 6 pages.

* cited by examiner

200

# PERFORMANCE MONITORING IN PASSIVE OPTICAL NETWORKS

RELATED APPLICATION

This application is a continuation of U.S. patent application Ser. No. 12/579,209, filed on Oct. 14, 2009 and assigned U.S. Pat. No. 8,442,398, which claims the benefit of U.S. Provisional Patent Application No. 61/107,255, filed on Oct. 21, 2008, both of which are incorporated by reference herein in their entirety.

BACKGROUND

1. Field

This disclosure is generally related to a passive optical network (PON). More specifically, this disclosure is related to performance monitoring in a PON.

2. Related Art

In order to keep pace with increasing Internet traffic, network operators have widely deployed optical fibers and optical transmission equipment, substantially increasing the capacity of backbone networks. A corresponding increase in access network capacity is also needed to meet the increasing bandwidth demand of end users for triple play services, including Internet protocol (IP) video, high-speed data, and packet voice. Even with broadband solutions, such as digital subscriber line (DSL) and cable modem (CM), the limited bandwidth offered by current access networks still presents a severe bottleneck in delivering large bandwidth to end users.

Among different competing technologies, passive optical networks (PONs) are one of the best candidates for next-generation access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and ATM, which facilitate interoperability between PONs and other network equipment.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 1). Note that other topologies are also possible including ring and mesh topologies.

Transmissions within a PON are typically performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. The ONU can reside in the residence of the customer and couples to the customer's own home network through a customer-premises equipment (CPE). Sometimes, an ONU is also referred as an optical network terminal (ONT), which terminates the PON and presents the customer-service interface to users. In this disclosure, the term "ONU" refers to ONU, ONT, or any other downstream node equipments in a PON.

In the example of an Ethernet PON (EPON), communications can include downstream traffic and upstream traffic. In the following description, "downstream" refers to the direction from an OLT to one or more ONUs, and "upstream" refers to the direction from an ONU to the OLT. In the downstream direction, because of the broadcast nature of the 1×N passive optical coupler, data packets are broadcast by the OLT to all ONUs and are selectively extracted by their destination ONUs. Moreover, each ONU is assigned one or more logical link identifiers (LLIDs), and a data packet transmitted by the OLT typically specifies an LLID of the destination ONU. If the data packet is a broadcast packet destined to all ONUs, then it will specify a broadcast LLID. In the upstream direction, the ONUs need to share channel capacity and resources, because there is only one link coupling the passive optical coupler to the OLT.

In order to avoid collision of upstream transmissions from different ONUs, ONU transmissions are arbitrated. This arbitration can be achieved by allocating a transmission window (also called a grant) to each ONU. An ONU defers transmission until its grant arrives. A multipoint control protocol (MPCP), which resides in the media access control (MAC) control layer, can be used to assign transmission time slots to ONUs. MPCP employs REPORT (an upstream message from the ONU to inform its queue information to the OLT) and GATE (a downstream message from the OLT to grant bandwidth to ONUs) control messages to request and assign transmission opportunities on the EPON.

FIG. 1 illustrates a passive optical network including a central office and a number of customers coupled through optical fibers and a passive optical splitter (prior art). A passive optical splitter 102 and optical fibers couple the customers to a central office 101. Multiple splitters can also be cascaded to provide the desired split ratio and a greater geographical coverage. Passive optical splitter 102 can reside near end-user locations to minimize the initial fiber deployment costs. Central office 101 can couple to an external network 103, such as a metropolitan area network operated by an Internet service provider (ISP).

Although FIG. 1 illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs), gigabit PONs (GPONs, which are PONs using a variant of a generic framing protocol), and wavelength division multiplexing (WDM) PONs.

In order to provide low-cost, high-bandwidth, and reliable service to customers, a PON needs to remain reliable and cost-efficient approach. PON maintenance should ideally provide proactive and continuous monitoring of network health without service disruption, and perform fault diagnosis of common failures in optical transceiver modules, as well as in the optical distribution network (ODN) fiber segments and passive splitter elements.

SUMMARY

One embodiment provides a system for performance monitoring in a passive optic network (PON). The system includes an optical line terminal (OLT) and an optical network unit (ONU). The OLT includes an optical transceiver configured to transmit optical signals to and receive optical signals from the ONU, and a performance monitoring mechanism configured to monitor performance of the PON based on received optical signals.

In a variation on the embodiment, the ONU includes a switch coupled to the ONU's transmitter, and the switch is configured to electrically disconnect the ONU's transmitter based on an instruction received from the OLT.

In a variation on the embodiment, the performance monitoring mechanism includes an optical power monitor configured to monitor optical power of signals received from the ONU.

In a further variation, the performance monitoring mechanism is configured to select the ONU for performance monitoring, assign a logical link identifier dedicated to performance monitoring to the ONU, and grant a transmission window with a predetermined length to the logical link identifier. The logical link identifier cannot be used for regular data transmissions.

In a further variation, the power monitor is configured to measure optical power within a sampling period, and the sampling period can be arbitrarily aligned within an ONU transmission window. Note that a sampling period is smaller than the smallest transmission window. In other words, the sampling acquisition can be completed for a transmission window carrying the smallest Ethernet packet (64 bytes). As such, the sampling period can be configured at various locations within a transmission window.

In a further variation, a start time of the sampling period aligns with the beginning of the ONU transmission window.

In a further variation, a start time of the sampling period aligns with the end of the ONU transmission window.

In a variation on the embodiment, the ONU includes a forward-error-correction (FEC) mechanism.

In a further variation, the performance monitoring mechanism is configured to monitor performance of the ONU based on FEC statistics specific to the ONU.

In a further variation, the FEC mechanism is configured to generate a separate bit sequence that can be used to extract the FEC statistics specific to the ONU.

In a variation on the embodiment, the performance monitoring mechanism is further configured to monitor the ONU performance based on line coding statistics, such as 8b/10b line coding errors.

DETAILED DESCRIPTION

Figure 1:
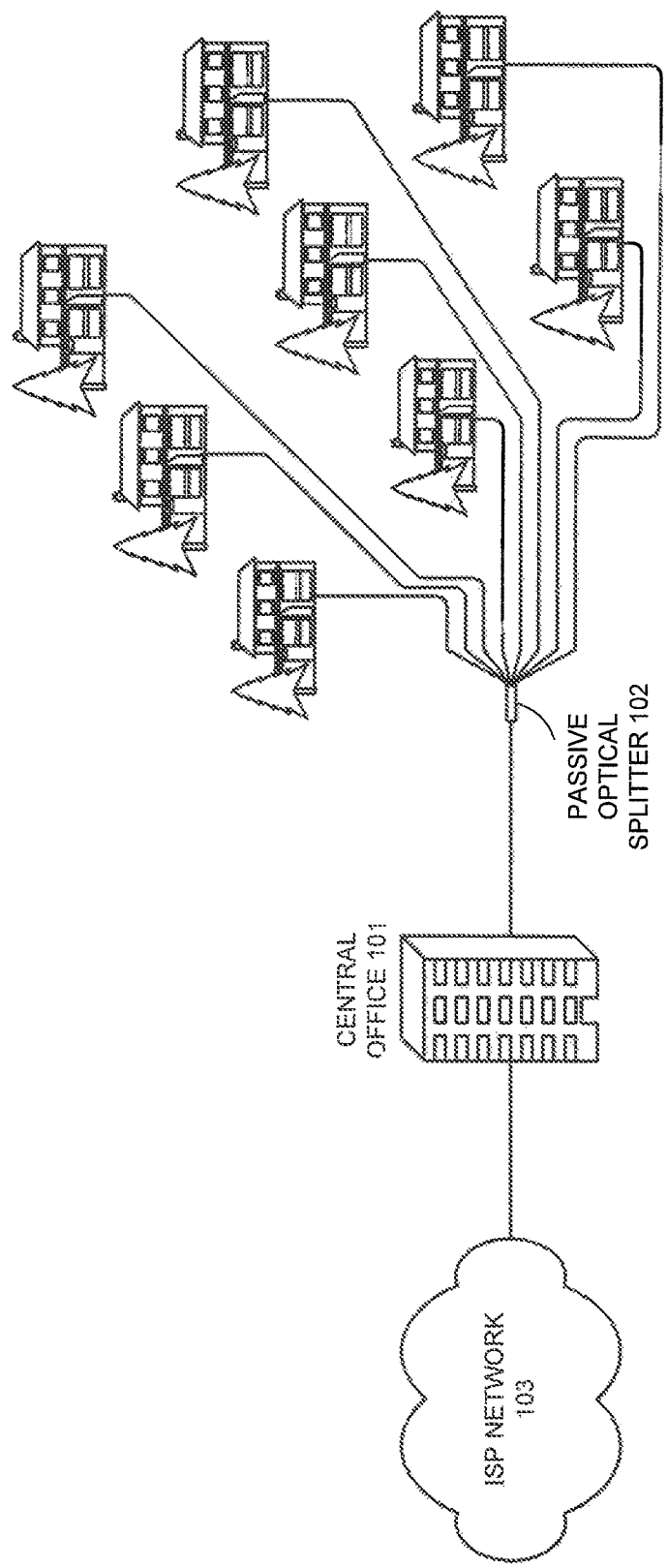
FIG. 1 presents a diagram illustrating a PON wherein a central office and a number of customers are coupled through optical fibers and a passive optical splitter (prior art).

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for monitoring performance in a PON. During operation, the system monitors the performance of a PON based on received optical signals. In some embodiments, the system monitors optical transceivers' performance by monitoring received optical power. In further embodiments, the system employs bit-error-rate (BER)-based performance monitoring.

Power Monitoring

In order to reduce operational expenditure, improve the network and service availability, and minimize subscriber downtime, it is desirable for a PON to implement a performance monitoring and fault management system.

Faults in a PON can include network faults (such as failure of the routing protocol), equipment faults (such as failure of an OLT line card or an ONU), optical component faults (such as failure of optical transceivers), and ODN faults (such as failure of fibers, connectors, and splitters). The network and equipment faults can be detected and managed by implementing performance monitoring at the application layer (such as the system management and control software) and the network layer (such as at the TCP/IP layer). The optical components and ODN faults can be detected and managed at the data-link layer (such as at the EPON media access control (MAC) layer), and the physical layer (such as at the optical layer).

Optical monitoring (or performance monitoring at the optical layer) provides a cost-effective method of fault detection in a PON. Some embodiments of the present invention provide an optical monitoring system that can detect optical transceiver failures and ODN failures. Optical transceiver failures can occur for many reasons including transceiver performance out of specification, a laser being "stuck," and transceiver aging. For example, a transmitter (laser) may transmit optical signals with optical power that is too high or too low in comparison with specified product performance, or an ONU's laser may be "stuck" on or leaking power during a non-transmission window for this particular ONU, thus producing unwanted interference to other ONUs. Similarly, an ONU's laser may be "stuck" off and fail to transmit when its grant arrives. In addition, after being deployed to the field, the ONU's laser ages, and its output power may decrease when it is near the end of its life. To overcome ONU transceiver failures, replacements of the failed transceivers are often needed. ODN failures can include fiber failures, such as fiber cut or excessive bending, and passive optical component failures, such as failed optical connectors or splitters. Fiber cut may result in total loss of optical power, while a bent fiber or a loosening connector may result in increased insertion loss, which can contribute to the received optical signal strength being below receiver sensitivity. To solve the problems caused by the ODN failures, repairs of the failed components are often needed.

Some embodiments of the present invention monitor received optical power to detect faults in transceivers. Note that transceivers on both the OLT and the ONUs need to be monitored. In one embodiment, transceivers on the OLT side and on the ONU side are monitored together. In another embodiment, the OLT-side transceiver and the ONU-side transceiver are monitored independently. The OLT-side transceiver can be monitored locally; that is, the monitoring mechanism is located on or near the OLT. However, because ONUs are located closer to the customers, it is desirable to being able to monitor the ONU-side transceivers remotely. In addition, adding power-monitoring mechanisms on each ONU within a PON may increase costs. In one embodiment of the present invention, a single power-monitoring mechanism resides on the OLT and monitors optical power received from each ONU coupled to the OLT, thus detecting possible transmitter failure of a downstream ONU. In addition to detecting transceiver faults, the system can also determine which ONU is the faulty unit by performing fault diagnosis.

Figure 2:
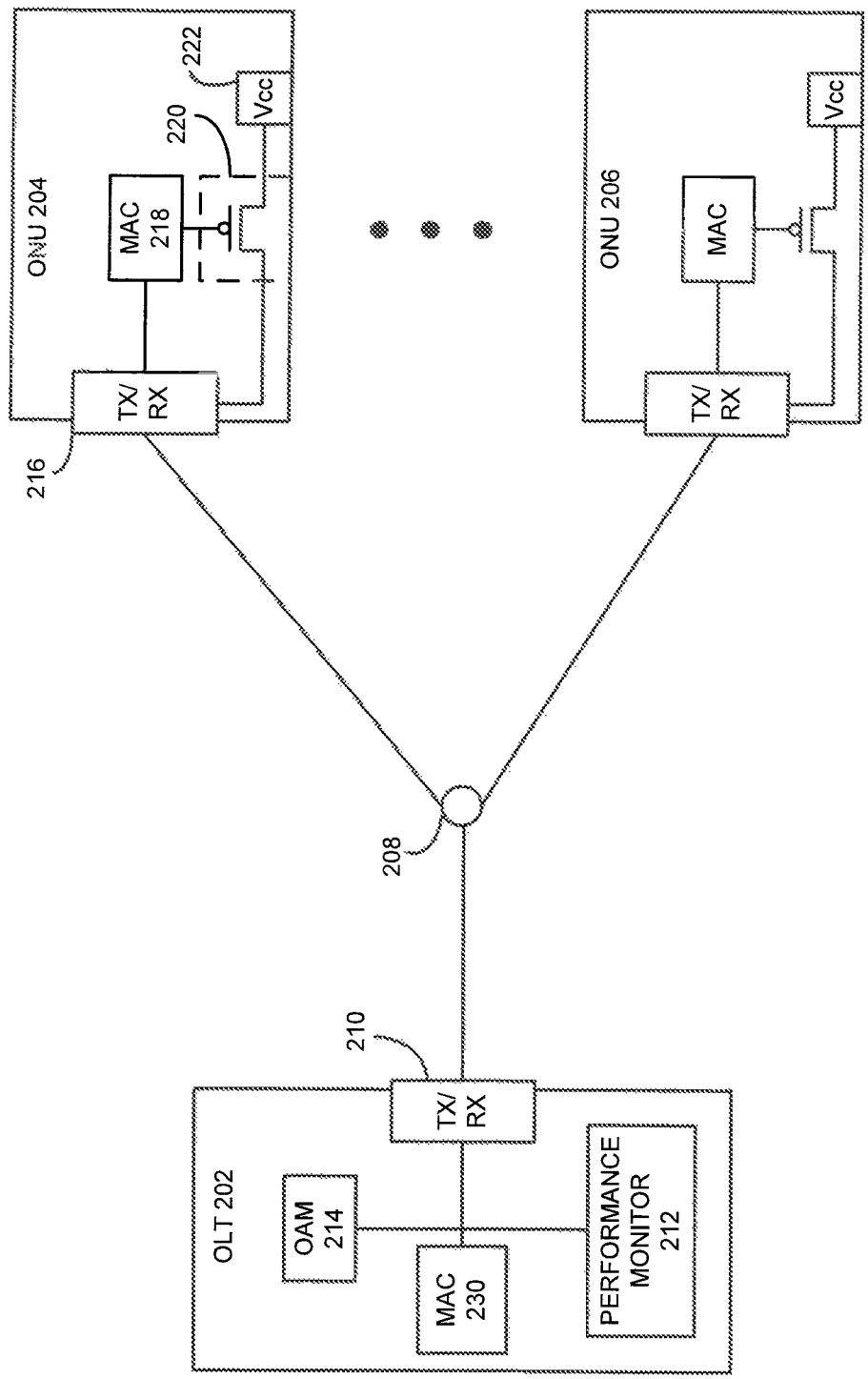
FIG. 2 presents a diagram illustrating the architecture of an exemplary EPON in accordance with an embodiment of the present invention.

FIG. 2 presents a diagram illustrating the architecture of an exemplary EPON in accordance with an embodiment of the present invention. EPON 200 includes an OLT 202 and a number of ONUs, such as ONUs 204 and 206. ONUs 204 and 206 are coupled to OLT 202 via a passive optical splitter 208.

OLT 202 includes a transceiver 210, an ONU performance-monitoring mechanism 212, an Operations, Administration, and Management (OAM) module 214, and a media access control (MAC) module 230. Transceiver 210 transmits optical signals to and receives optical signals from downstream ONUs. ONU performance-monitoring mechanism 212 monitors the performance of downstream ONUs. In one embodiment, ONU performance-monitoring mechanism 212 monitors optical power received from downstream ONUs. OAM module 214 generates Operations, Administration, and Management (OAM) messages that can be sent to downstream ONUs, and can be used for fault diagnosis.

ONU 204 includes a transceiver 216, a media access control (MAC) module 218, a switch 220, and a power supply 222. Transceiver 216 transmits optical signals to and receives optical signals from OLT 202. Switch 220 is coupled to transceiver 216, and is configured to physically turn off a laser within transceiver 216 by cutting off the power supply to the optical transmitter based on a control signal received from MAC module 218. In one embodiment, switch 200 comprises a field-effect transistor (FET), and the control signal is sent to the gate terminal of the FET via a general-purpose input/output (GPIO) pin from MAC module 218. Power supply 222 provides constant power to switch 200.

During operation, OLT-side transceiver 210 receives upstream optical signals from ONU-side transceiver 216. ONU performance-monitoring mechanism 212 monitors the received optical signals in order to determine the health of ONU-side transceiver 216. Under certain circumstances, ONU performance-monitoring mechanism 212 may want to turn off a laser within ONU-side transceiver 216. For example, ONU performance-monitoring mechanism 212 may conclude that the laser is "stuck" on and is interfering with the upstream transmissions with other ONUs. Before transceiver 216 can be replaced, it needs to be turned off. Alternatively, ONU performance-monitoring mechanism 212 may want to turn off the laser for diagnostic purposes. To do so, ONU performance-monitoring mechanism 212 instructs OAM module 214 to generate an OAM message destined to ONU 204. ONU-side transceiver 216 receives the OAM message and passes it to MAC module 218, which in turn controls switch 220 to turn off a laser within transceiver 216. The presence of switch 220 provides OLT 202 the ability to "physically" turn off a laser within transceiver 216, which is an important fault management feature. Note that sometimes a transceiver's laser cannot be turned off while its receiver is powered on. In one embodiment, ONU 204 includes a timer-based mechanism so that transceiver 216 can be turned back on after a specified time period expires. This capability allows transceiver 216 to be turned off remotely for a specified duration for diagnostic purpose.

The bursty nature of the EPON upstream transmissions makes it difficult to monitor upstream optical power, because conventional power-monitoring schemes are often directed toward continuous-mode power monitoring, which measures average receiving optical power. Power monitoring on an EPON requires the ability to measure ONU burst optical power levels at specific intervals within grant times for particular logical links, as well as ONU optical power levels outside of any grant times; that is, between ONU transmissions, or times where the upstream link should be idle with no optical power other than leakage from the ONUs. If sufficient power is received during an otherwise idle period, a failure condition is thus detected indicating that at least one ONU is leaking optical power. The exact ONU with the failure condition can be determined either by examining the LLID from which the power measurement is taken or by performing further diagnostic procedures. Measuring the upstream burst optical power level needs a fast sample-and-hold analog-to-digital converter (ADC), which can take a sample in less time than the shortest ONU grant time ($\leq 672$ ns). In addition, the start and end times of the sampling interval of the ADC needs to be precisely controlled in order to correctly place the sample capture time within a single upstream burst, so that power from one particular ONU laser can be measured.

In some embodiments, optical transceivers in the OLT and the ONUs can be a small form-factor (SFF) or a small form-factor pluggable (SFP) transceiver that includes an embedded ADC and a digital diagnostic monitoring interface (DDMI). In one embodiment, the DDMI conforms to small form factor specification 8472 (SFF-8472). The DDMI can report a number of performance-monitoring statistics as specified by SSF-8472, including but not limited to: receiver power for each ONU during both active and idle periods, transmitter power, transmitter bias current (often an indicator of the health of the laser), temperature, and supply voltage. These measurements can help diagnose problems including aging condition, temperature effect, performance degradation, and laser failure.

Figure 3:
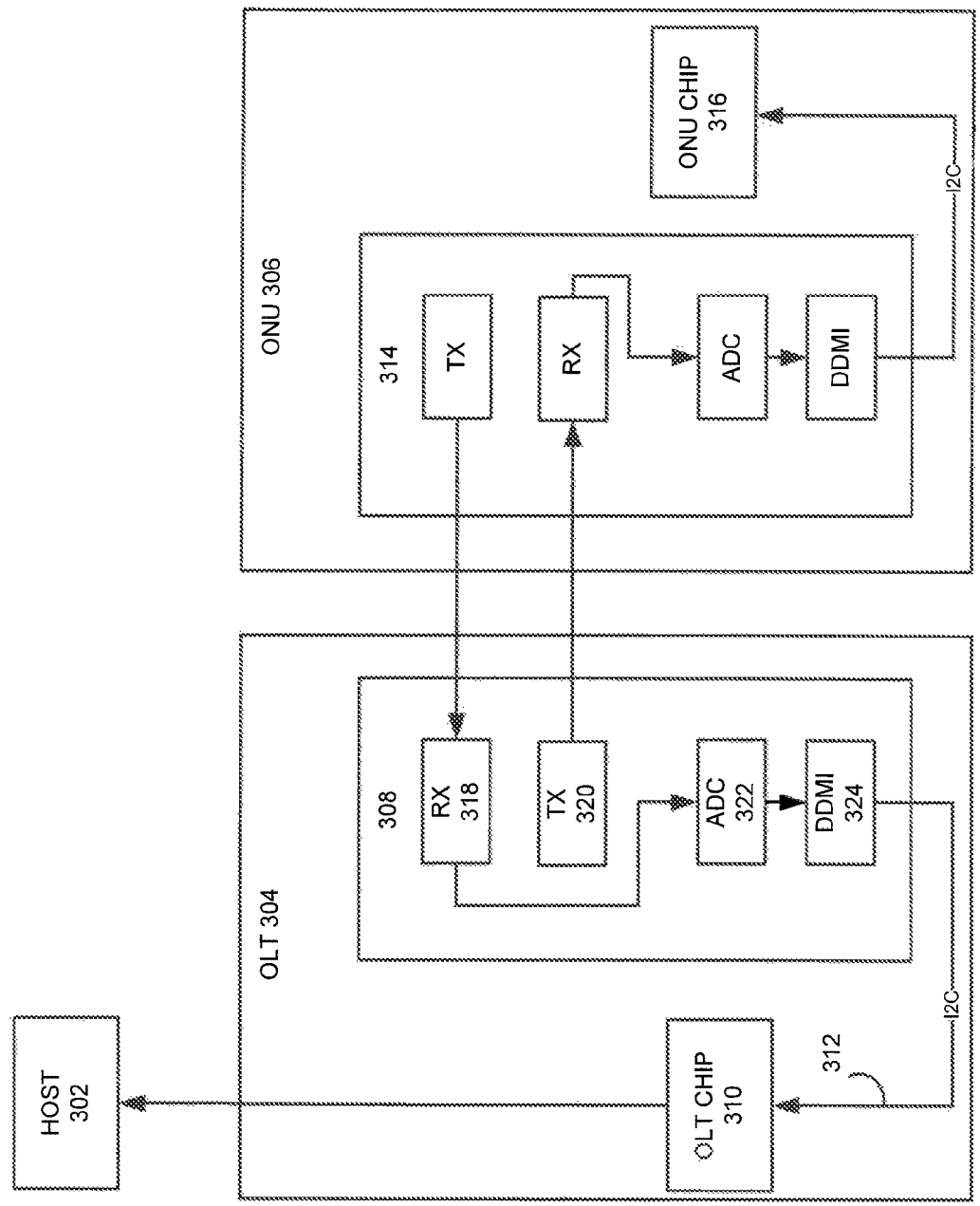
FIG. 3 presents a diagram illustrating an optical-power-monitoring system that implements digital diagnostic monitoring interface (DDMI)-enabled small form-factor (SFF) or small form-factor pluggable (SFP) optical transceiver in accordance with an embodiment of the present invention.

FIG. 3 presents a diagram illustrating an optical-power-monitoring system that implements a DDMI-enabled SFF or SFP optical transceiver in accordance with an embodiment of the present invention. Optical-power-monitoring system 300 includes a host 302, an OLT 304, and an ONU 306. OLT 304 includes a DDMI-enabled SFP optical transceiver 308 and an OLT chip 310. Similarly, ONU 306 includes a DDMI-enabled SFP optical transceiver 314 and an ONU chip 316. Optical transceiver 308 includes a receiver 318, a transmitter 320, an ADC 322, and a DDMI 324. To measure ONU 306's upstream transmission power, OLT chip 310 provides a sampling strobe that triggers ADC 322 to acquire a sample of power received by OLT-side receiver 318 as a digital value. The start and end times of the strobe can be configured by software running on host 302. The power value is sent to OLT chip 310 via DDMI 324 and an inter-integrated circuit (I2C) bus 312. Host 302 can then retrieve measurement statistics from OLT 304 via a host interface. In one embodiment, the host software can include a graphical user interface (GUI) that allows a network operator to configure the length and position of the ADC sampling window, and to read the measurement results. In a further embodiment, the network operator can select a particular logical link for power monitoring. This mode is useful when a particular ONU is suspected with potential failures. In addition, the network operator can choose to perform monitoring all logical links in a round robin fashion, which is useful for continuous monitoring under normal network condition.

The firmware of OLT 304 can measure received optical power for each logical link by programming the sampling strobes to trigger during an assigned grant for that particular logical link. Note that according to the IEEE 802.3ah standard, ONUs can send at least one MPCP REPORT frame every 50 ms. In practice, idle ONUs transmit at least as often as the polling interval programmed in the service level agreement (SLA) for that logical link by host software, typically on the order of a few milliseconds. An active ONU transmits even more frequently. In one embodiment, OLT firmware measures received optical power from each logical link in turn, including idle periods, and retains those power measurement as statistics which can be retrieved by the host. In a further embodiment, OLT firmware samples one link each second. Note that, when an ONU is assigned more than one LLID, the OLT firmware can sample just one of the logical links due to the fact that all those LLIDs share a single optical transceiver. Other measurements, such as transmit power and temperature, are not related to upstream bursts; thus, they can be read at OLT 304 at any time.

Measurements at ONU 306 are similar to those at OLT 304, though simpler. ONU 306 measures active optical power when the laser is enabled, and idle optical power when the laser is disabled. Transmit power is not measured per logical link at the ONU because it is the same physical laser in all cases. Received optical power in the downstream is available continuously; thus it can be read at ONU 306 at any time. In one embodiment, to reduce the cost for the ONU, transceiver 314 may not include the embedded ADC as well as the DDMI.

Figure 4:
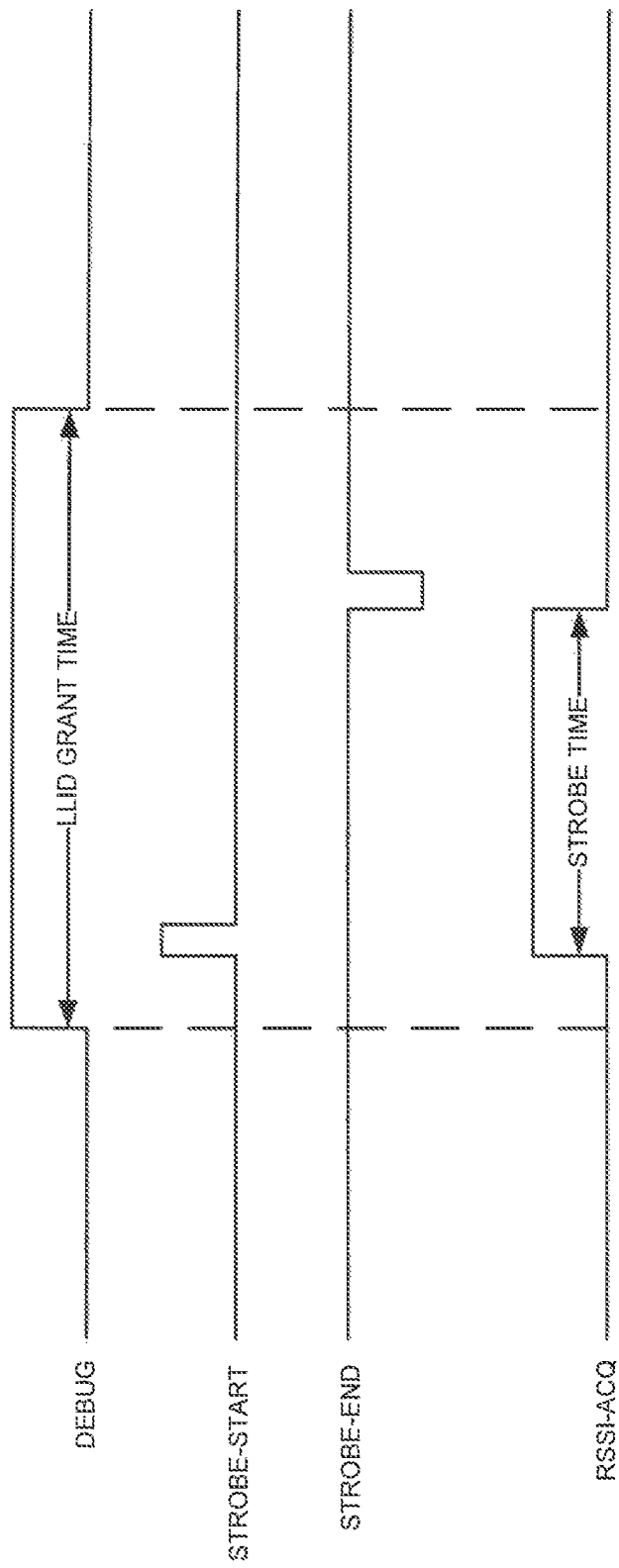
FIG. 4 presents a timing diagram illustrating the time sequence of the debug signal, the start strobe signal, the end strobe signal, and the RSSI_ACQ signal in accordance with an embodiment of the present invention.

In order to configure the start and end times of the RSSI sample strobe, OLT chip 310 needs to provide three output signals including a debug signal, a strobe-start signal, and a strobe-end signal. These three OLT-chip-output signals can be combined by an external circuit to generate one pulse to the optical transceiver which defines the sampling interval. The pulse is named RSSI_ACQ. The strobe-start signal triggers the start of the RSSI_ACQ signal, and the strobe-end signal triggers the end of the RSSI_ACQ signal. Note that all signals can be manipulated in an increment of an MPCP time quantum (16 ns), allowing very high precision of the ADC triggering and sampling times. FIG. 4 presents a timing diagram illustrating the time sequence of the Debug signal, the start strobe signal, the end strobe signal, and the RSSI_ACQ signal in accordance with an embodiment of the present invention.

The debug signal is asserted when the link being measured has an active grant slot. In one embodiment, the OLT firmware programs the OLT chip to assert the debug signal for each logical link in turn. In order to measure idle power, in one embodiment, the OLT is configured to allocate a grant to a "fake" LLID, which is an LLID that does not belong to any ONUs on the PON. During the time interval of the "fake" LLID's grant, no ONU is transmitting; thus, idle power can be measured.

The strobe-start and the strobe-end signals can be configured by the host software to activate during a period of time after the start of the grant slot. In one embodiment, the host software can configure the duration, polarity, and offset from the grant start time of the strobe-start and strobe-end signals. The ADC begins sampling at the rising end of RSSI_ACQ and latches the average value on the falling edge of the output. The RSSI_ACQ signal can be moved to any place within the grant and can be configured to any length by moving the positions of the strobe-start and the strobe-end signals within the grant. The RSSI_ACQ signal needs to be long enough to satisfy the ADC sampling requirements.

In one embodiment, to facilitate power monitoring, the OLT is configured to generate an LLID dedicated for performance-monitoring purposes, and allocates a fixed-length grant to the LLID. In a further embodiment, the monitor-LLID is granted a transmission window lasting for 100 ms. In one embodiment, the monitor LLID cannot be used for regular data transmissions for any registered ONUs. Allocating transmission window with sufficient length to the performance-monitoring LLID guarantees sufficient ADC sampling time. The OLT is also configured to assign the performance-monitoring LLID to each coupling ONU in a round-robin way.

The health of a laser can also be indicated by its turn-on and turn-off times. An aged laser often exhibits abnormally long turn-on or turn-off times. A longer turn-on time can result in weakened receiving power at the beginning of the grant, and a longer turn-off time can result in unwanted overlap between transmissions of two ONUs. Therefore, it is important to be able to monitor optical power in the vicinity of both the rising and the falling edges of the ONU transmission. In one embodiment of the present invention, the sampling strobe (the RSSI_ACQ signal) can be precisely placed at a location with respect to the start or end time of a laser transmission, thus allowing power monitoring at the beginning and the end of the transmission.

Figure 5:
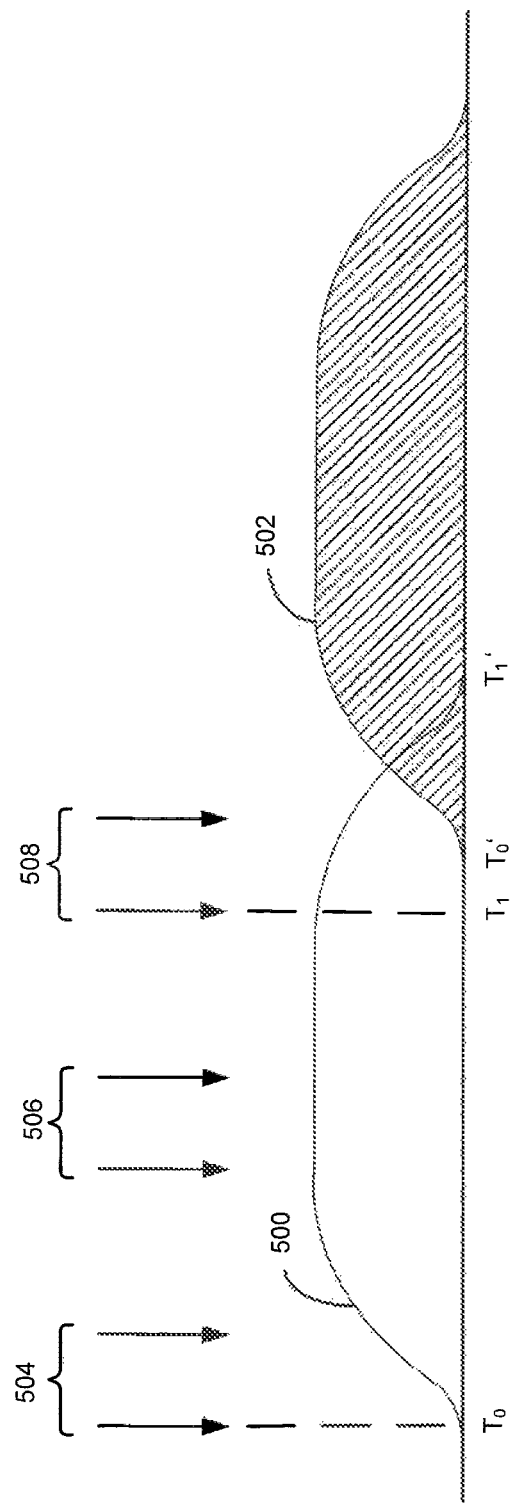
FIG. 5 presents a diagram illustrating placements of sampling strobes in accordance with an embodiment of the present invention.

FIG. 5 presents a diagram illustrating placements of sampling strobes in accordance with an embodiment of the present invention. At time $T_0$, an ONU starts a transmission 500, and at time $T_1$, the laser is turned off to end transmission 500. However, due to the existence of a prolonged falling edge, the ONU laser continues to transmit power until time $T_1'$. The OLT can place a sampling strobe 504 starting at $T_0$ to measure the optical power of the rising edge of the laser. The OLT can also offset sampling strobe 504 with respect to $T_0$. To measure the optical power when the laser reaches its full power, a sampling strobe 506 can be placed at a location where the laser is transmitting with full power. To measure the falling edge of the laser transmission, the OLT can place a sampling strobe 508 starting at $T_1$. The OLT can also offset sampling strobe 508 with respect to $T_1$. Being able to place a sampling strobe at an exact location with respect to the starting or ending time of a laser transmission provides the OLT the ability to diagnose laser abnormality at both the on and off edges.

In addition, the ability to place a sampling strobe at a precise location near the end time of a transmission makes it possible to detect any overlap between transmissions. For example, before optical power from transmission 500 dies out, another ONU may start a transmission 502 at time $T_0'$, resulting in an overlap between transmissions 500 and 502 as shown in FIG. 5.

Figure 6:
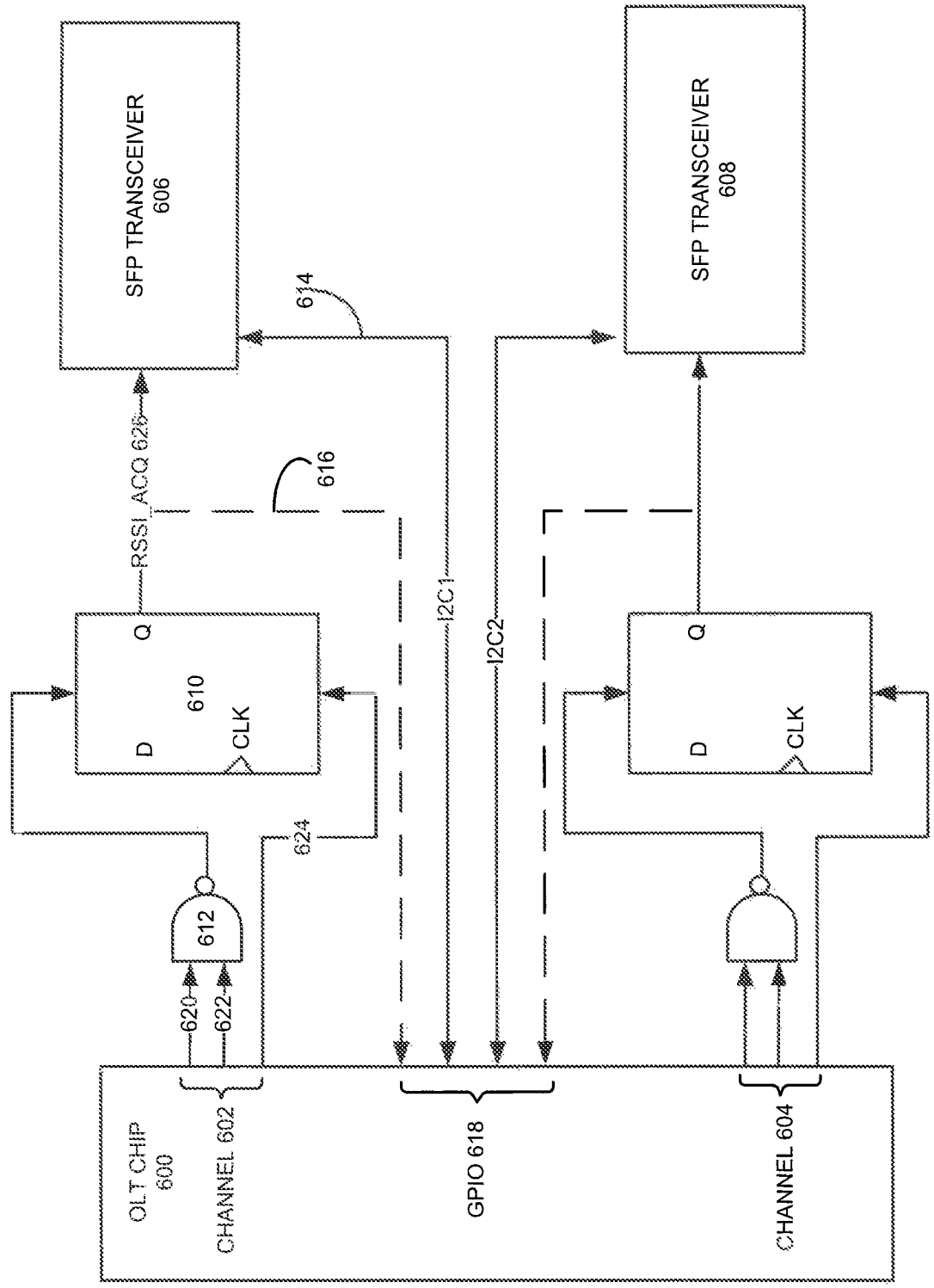
FIG. 6 presents a diagram illustrating an exemplary circuit configuration for connecting an OLT chip to an embedded analog-to-digital converter (ADC) in accordance with an embodiment of the present invention.

FIG. 6 presents a diagram illustrating an exemplary circuit configuration for connecting an OLT chip to an embedded ADC in accordance with an embodiment of the present invention. In FIG. 6, OLT chip 600 includes channels 602 and 604 for coupling to SFP transceivers 606 and 608, respectively, and is thus capable of providing two transmission channels to a downstream PON. Each channel provides three output signals that can be combined to generate the RSSI_ACQ pulse. For example, channel 602 provides a strobe-start signal 620, a debug signal 622, and a strobe-end signal 624. Strobe-start signal 620 and debug signal 622 are sent to a NAND logic gate 612. The output of logic gate 612 and strobe-end signal 624 are sent to a flip-flop 610 as set and reset inputs, respectively. The output of flip-flop 610 provides a sampling strobe (RSSI_ACQ) signal 626 to DDMI-enabled SFP transceiver 606. Sampling strobe signal 626 triggers transceiver 606 to acquire a sample of the received power as a digital value that can be read from transceiver 606 by OLT chip 600 via an I2C bus 614. In addition to providing an interface to I2C buses, such as I2C bus 614, GPIO interface 618 can also provide an optional feedback connection 616, which sends feedback regarding RSSI_ACQ signal 626 back to OLT chip 600. Such feedback notifies the OLT firmware that a sample has been collected, and helps to ensure that collected statistics are valid.

BER-Based Performance Monitoring

In addition to optical power, BER statistics can also be used for performance monitoring because optical hardware aging and timing errors generally result in bit errors, which can be detected by several means. Increases in the BER or unusual patterns in the BER across ONUs and logical links often indicate laser problems. Because BER statistics can be collected with existing system components, BER-based performance monitoring can be performed without the need to add new components, thus resulting in no extra hardware costs or hardware reconfiguration. In addition, BER-based performance monitoring can be deployed in existing and expanding networks, as well as in new networks.

Figure 7:
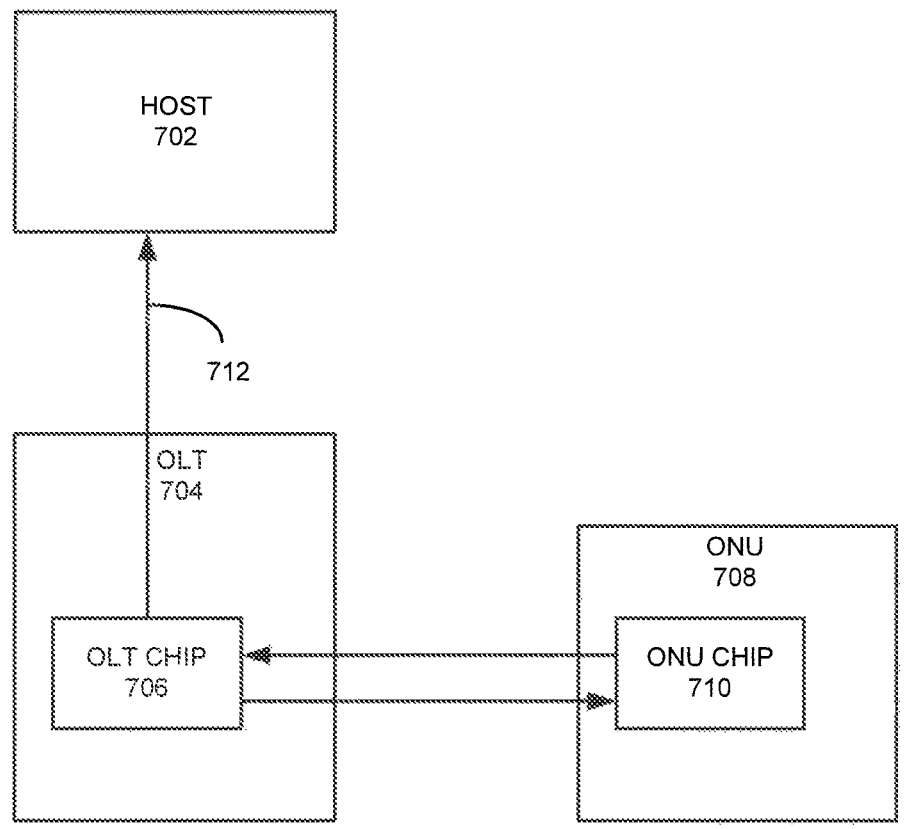
FIG. 7 presents a diagram illustrating the architecture of an exemplary EPON implementing bit-error-rate (BER)-based performance monitoring in accordance with an embodiment of the present invention.

FIG. 7 presents a diagram illustrating the architecture of an exemplary EPON implementing BER-based performance monitoring in accordance with an embodiment of the present invention. EPON 700 includes a host 702, an OLT 704, which includes an OLT chip 706, and an ONU 708, which includes an ONU chip 710. OLT chip 706 communicates with ONU chip 710, and sends BER-related statistics for both OLT 704 and ONU 708 to a host 702 via a host interface 712.

Various types of errors can be reported by BER-based performance monitoring, including optical-transceiver-related failures and network failures. Various BER-related statistics can be collected including 8B/10B decoding error statistics and forward error correction (FEC) statistics. Depending on where errors fall in the Ethernet frame, the errors can be reflected by several error statistics. For example, errors in the 8B/10B words that carry the preamble of the Ethernet frame are detected by the cyclic redundancy check (CRC)-8 field over the preamble, and errors in the main body of the Ethernet frame are detected by the CRC-32 field over the entire frame. In addition, errors in the main body of the Ethernet frame also result in and are detected by the "invalid code group" message during line code decoding process at the receiver end.

Sometimes FEC is used in order to enhance the link budget and BER performance of an EPON. In one embodiment of the present invention, FEC function is turned on when the received power has been reduced to a certain amount. For example, when an ONU's transmission power decreases due to an aging laser, the FEC on the receiving OLT may be turned on to ensure the ONU's transmission is received correctly. If the ONU's transmission power continues to decrease to a point that even the FEC cannot guarantee proper receiving, then the ONU laser may need to be replaced. The increased bit errors can also be caused by an unexpected insertion loss along the path, which further indicates either the ONU laser is out of specification, or failure of certain connectors (for example, loose connectors), or misaligned fiber segments, etc.

FEC is an error control scheme that can be used for data transmission, whereby the sender adds redundant data to its messages, thus allowing the receivers to detect and/or correct errors (within certain bounds) without needing to ask the sender for additional data. To accomplish error monitoring, IEEE standard 802.3 defines counters that can count corrected FEC blocks and uncorrected FEC blocks. Because each ONU receives all downstream data packets, the FEC sublayer within an ONU receives and corrects all downstream data packets accordingly. As a result, the ONU is only aware of the total number of corrected or uncorrected FEC blocks for all downstream data packets. To implement BER-based performance monitoring, it is desirable to count the number of corrected errors within data packets headed to each individual LLID on the OLT side in the upstream direction.

There are many possible FEC solutions that implement different error-correction codes, such as Reed-Solomon, Golay, Hamming, and low-density parity-check (LDPC) codes. One embodiment of the present invention uses the Reed-Solomon (255, 223) code in a 10G EPON. One further embodiment uses a RS (255, 239) code in a 1G EPON.

Reed-Solomon codes are block codes, which means that a fixed block of input data is processed into a fixed block of output data. A Reed-Solomon code is specified as RS (n,k) with s-bit symbols. This means that the encoder takes k data symbols of s bits each and adds parity symbols to make an n-symbol code block. Each code block has n−k parity symbols of s bits each.

In the case of a Reed-Solomon (255, 223) code with 8-bit symbols, which is one of the most commonly used Reed-Solomon codes, 223 symbols (each 8 bits long) of raw input data are encoded into 255 bytes of output code block. In other words, a Reed-Solomon (255, 223) code block includes two parts, the data part and the parity part. The first 223 bytes are data bits, which is the information to be protected against corruption, and the following 32 bytes are parity bits, which are calculated based on the data bits.

Figure 8:
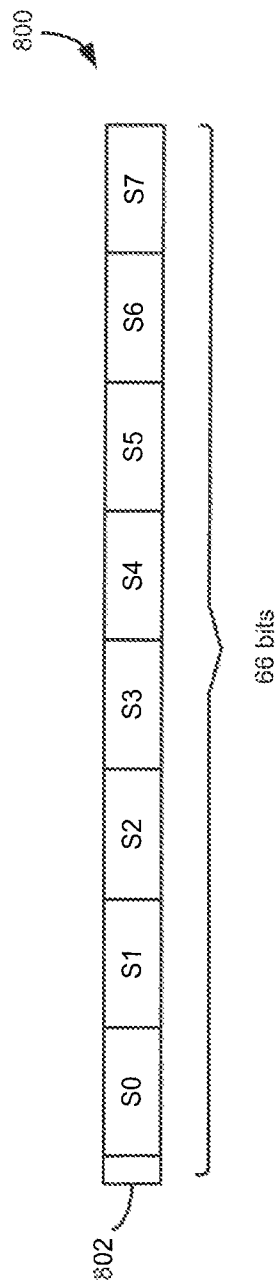
FIG. 8 presents a diagram illustrating the format of a 64B/66B encoded block (prior art).

Before constructing a Reed-Solomon code block, we need to introduce the line code used in 10 Gigabit (10 G) EPON. To achieve DC-balance and bounded parity, 10 Gigabit EPON uses 64B/66B line code to encode transmitted data packets. 64B/66B line code encodes 8 bytes (64 bits in total) of data and/or control codes into a codeword of 66 bits. FIG. 8 presents a diagram illustrating the format of a 64B/66B encoded block (prior art). 64B/66B encoded block 800 includes 8 bytes (S0-S7) of data and/or control codes, and a 2-bit sync header 802. Sync header 802 can have a value of "01" or "10," depending on whether the following 8 bytes (S0-S7) are all data words or are mixed with control information. In the latter case, the byte immediately following sync header 802 (S0) carries the type information of the control code. Note that sync header values of "00" and "11" are considered code errors.

Figure 9:
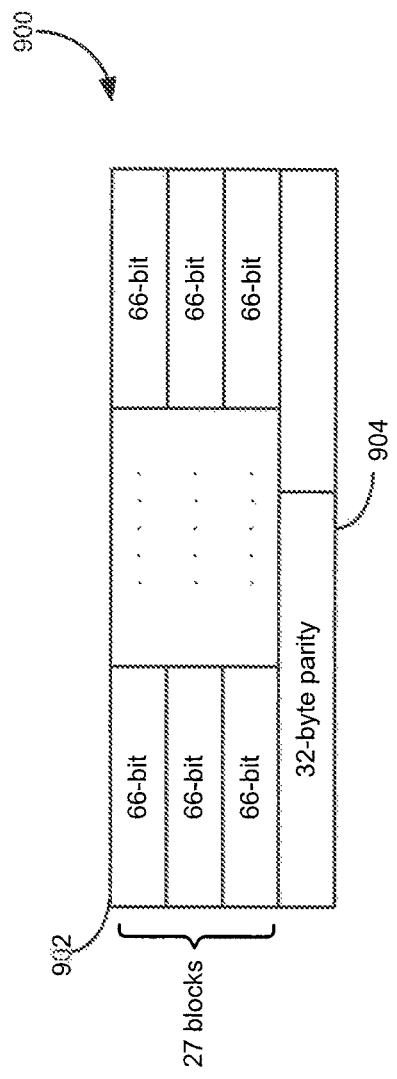
FIG. 9 presents a diagram illustrating the format of a constructed Reed-Solomon (255, 223) code block in accordance with an embodiment of the present invention.

FIG. 9 presents a diagram illustrating the format of a constructed Reed-Solomon (255, 223) code block in accordance with an embodiment of the present invention. Reed-Solomon (255, 223) code block 900 includes 27 blocks of the 66-bit long 64B/66B block, such as block 902, and a 32-byte parity block 904. 32-byte parity block 904 is calculated based on the 27 64B/66B blocks.

In the scenario of a downstream transmission, upon receiving data packets to be transmitted, the FEC encoder located on the OLT encodes data packets (constructs FEC code blocks) using a selected error-correction code, such as the Reed-Solomon (255, 223) code, and then broadcasts the FEC code blocks to all downstream ONUs. In one embodiment, the OLT FEC encoder constructs an FEC code block by aggregating 27 66-bit blocks plus 2 padding bits and 32 bytes of parity data.

When a downstream ONU receives the FEC-encoded data packets, the FEC decoder located on the ONU can establish FEC block synchronization using a conventional serial locking technique. Once synchronization is achieved, the FEC decoder attempts to identify the position and magnitude of transmission errors and correct them to recover the original data. The number of errors that can be identified and/or corrected is determined by the percentage of the overhead (redundancy). For a Reed-Solomon (255, 233) code with 8-bit symbols, the decoder can correct up to 16 symbol errors. A symbol error occurs when at least 1 bit in a symbol is wrong. Depending on the number and distribution of errors, the FEC decoder may or may not be able to detect all symbol errors. In addition, for all detected symbol errors, some can be corrected by the FEC decoder, while others may not be correctable. By counting the number of errors detected by the FEC decoder, it is possible to estimate the bit-error rate (BER) of a transmission link.

Because the downstream transmission is broadcast to all ONUs, each ONU receives all transmitted data packets before the packets are decrypted and filtered. Thus, the FEC decoder of an ONU decodes FEC code blocks that include data packets destined to different ONUs and reports corresponding error information, such as the total number of symbol errors, for each FEC code block. However, from an ONU's perspective, only data packets destined to itself are relevant, and it is desirable to obtain FEC statistics including number and positions of symbol errors for data packets that are destined to a particular ONU. To accomplish such a task, in one embodiment of the present invention, the FEC decoder not only generates recovered data but also generates a separate bit sequence that marks the positions of detected symbol errors. In a further embodiment, the separate bit sequence also distinguishes corrected symbol errors from uncorrectable symbol errors.

Figure 10:
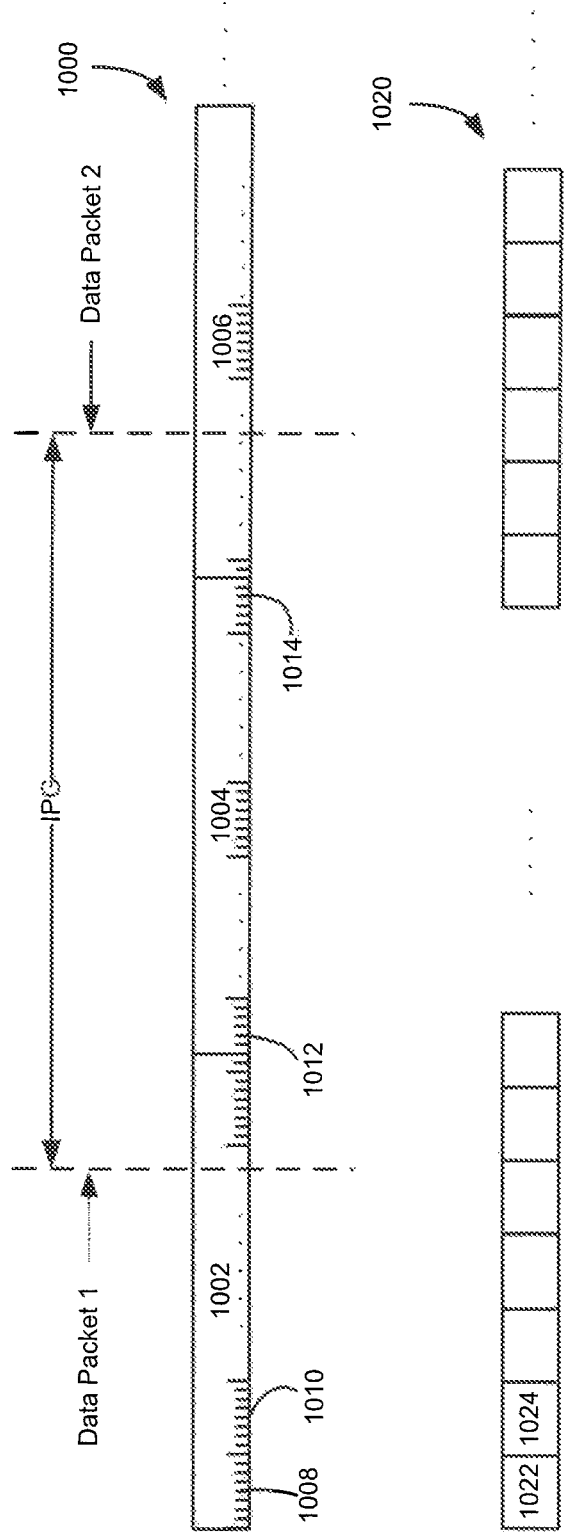
FIG. 10 presents a diagram illustrating an exemplary output of an FEC decoder in accordance with an embodiment of the present invention.

FIG. 10 presents a diagram illustrating an exemplary output of an FEC decoder in accordance with an embodiment of the present invention. The FEC decoder output includes recovered data sequence 1000 and its corresponding symbol-error-position bit sequence 1020. Recovered data sequence 1000 includes a number of 66-bit long 64B/66B codewords, such as codewords 1002, 1004, and 1006. Each codeword includes a number of 8-bit symbols, such as symbols 1008 and 1010. Because the 66-bit long 64B/66B codeword is not a multiple of 8, a symbol may cross over the boundary between two 64B/66B codewords. For example, symbol 1012 crosses the boundary between codewords 1002 and 1004, and symbol 1014 crosses the boundary between codewords 1004 and 1006.

Because the minimum length of an inter-packet gap (IPG), which is an idling period inserted between transmissions of Ethernet frames, as specified by IEEE standard 802.3 is 12 bytes, two adjacent Ethernet frames (packets) are always separated by at least one 64B/66B codeword. For example, data packet 1, which includes part of codeword 1002 and data packet 2, which includes part of codeword 1006, are separated by an IPG, which includes codeword 1004 and parts of codewords 1002 and 1006. From FIG. 10, one can see that it is impossible for an 8-bit symbol to cross the boundary of two data packets, thus eliminating possible ambiguity of error counts between two ONUs.

In order to keep track of the positions of errors detected by the FEC decoder, the FEC decoder also generates a symbol-error-position bit sequence 1020. In one embodiment, each bit of bit sequence 1020 corresponds to one 8-bit symbol in recovered data sequence 1000. For example, bits 1022 and 1024 correspond to symbols 1008 and 1010, respectively. The FEC decoder marks the positions of detected errors in recovered data sequence 1000 by setting the corresponding bits in bit sequence 1020. For example, if the FEC decoder detects that symbol 1010 contains an error, the decoder will set bit 1024 to "1;" otherwise, bit 1024 is set to "0."

In some embodiments, the FEC decoder may want to distinguish between errors that have been corrected and the uncorrectable errors. To do so, two bits in bit sequence 1020 correspond to one 8-bit symbol in recovered data sequence 1000 By setting the two bits to different values, the FEC decoder can mark a symbol in recovered data sequence 1000 as: "not an error," "a corrected error," or "an uncorrectable error."

After FEC decoding, symbol-error-position bit sequence 1020 is buffered and then sent to the upper layers, such as the media access control (MAC) layer, for processing along with recovered data sequence 1000. In one embodiment, symbol-error-position bit sequence 1020 is sent to the MAC layer via a separate bus parallel to the data bus that sends recovered data sequence 1000.

Based on the LLID tag included in each data packet, the ONU's MAC layer extracts data packets that are destined to the ONU and discards all other packets. Once a data packet that is destined to an ONU is identified, the system can count the number of errors within the data packet based on the accompanying symbol-error-position bit sequence. As a result, each ONU is able to obtain FEC statistics (including errors corrected by the FEC and uncorrectable errors) for data packets destined to itself. Based on the ONU-specified FEC statistics, the system is able to estimate the BER, thus achieving the task of ONU-specified link performance monitoring. Note that occasionally a symbol error may occur at the IPG between two data packets destined to two different ONUs. In one embodiment, the system keeps a separate count for such errors.

Figure 11:
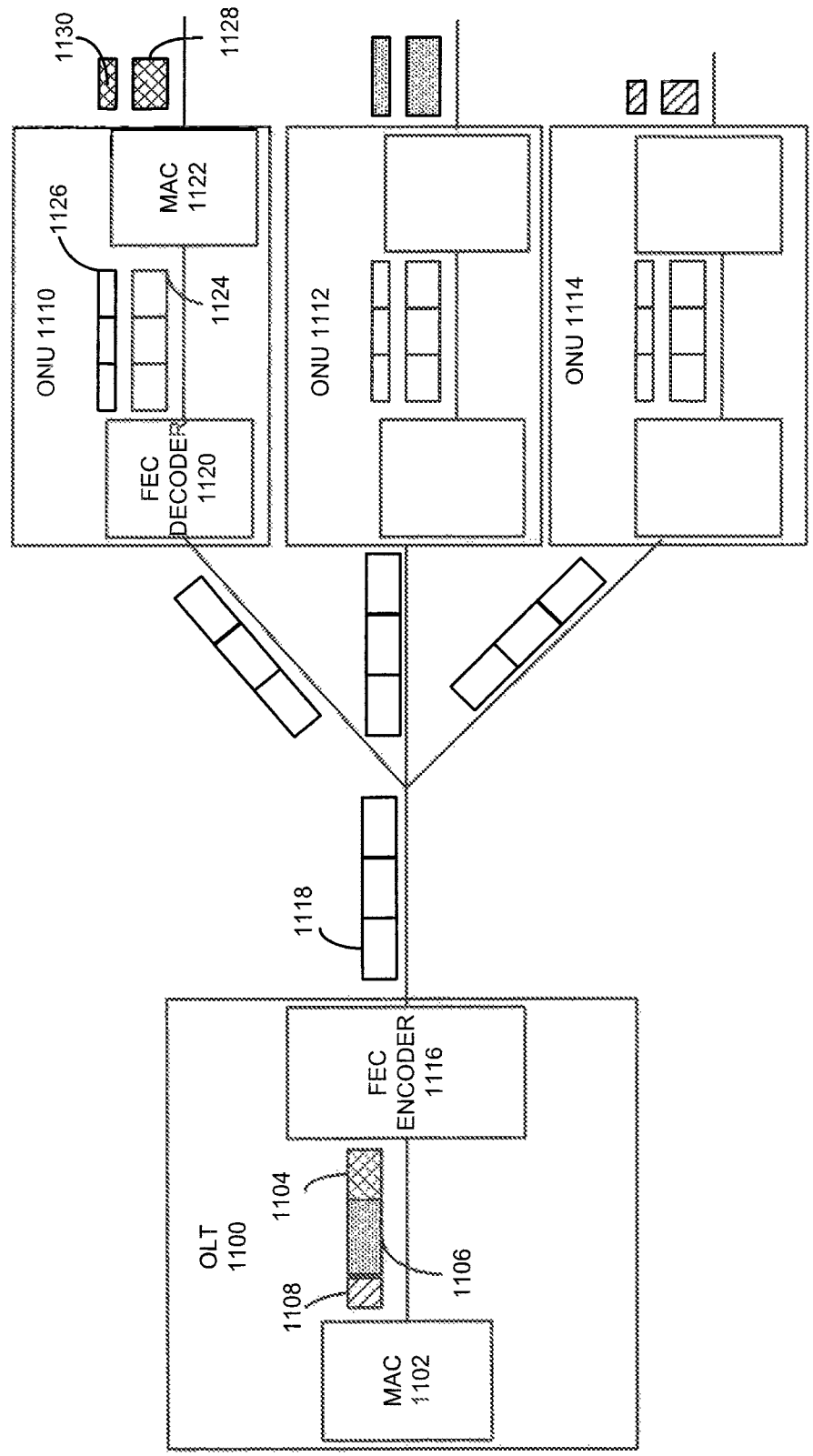
FIG. 11 presents a diagram illustrating the EPON downstream data transmission implementing FEC in accordance with an embodiment of the present invention.

FIG. 11 presents a diagram illustrating the EPON downstream data transmission implementing FEC in accordance with an embodiment of the present invention. An OLT 1100 includes a media access control (MAC) module 1102 and an FEC encoder 1116. OLT MAC module 1102 generates data packets destined to different ONUs, such as data packets 1104, 1106, and 1108 destined to ONUs 1110, 1112, and 1114, respectively. Before transmission, OLT FEC encoder 1116 aggregates and encodes data packets 1104-1108 into a number of FEC code blocks, such as FEC code block 1118.

Encoded FEC code blocks are broadcast to all downstream ONUs including ONUs 1110-1114. Each ONU includes an FEC decoder and a MAC module. For example, ONU 1110 includes an FEC decoder 1120, and a MAC module 1122. FEC decoder 1120 receives and decodes all received FEC code blocks to generate a recovered data sequence 1124, and an accompanying symbol-error-position bit sequence 1126. FEC decoder 1120 sends recovered data sequence 1124 and error-position bit sequence 1126 to ONU MAC module 1122 via a parallel bus. Based on the LLID tag contained in each data packet, ONU MAC module 1122 is able to select data packet 1128 destined to ONU 1110. At the same time, the bits within the symbol-error-position bit sequence that correspond to the symbols within data packet 1128 can also be filtered out, forming a bit sequence 1130. Bit sequence 1130 provides FEC error information (including both corrected and uncorrectable errors) for data packet 1128, and can be used for per-ONU BER-based performance monitoring.

In addition to FEC statistics, other types of error statistics can also be used for performance monitoring purposes. For example, when the FEC is disabled, line coding (such as 8b/10b coding) error statistics can also be used for performance monitoring purpose.

EXAMPLES

Power-monitoring-based and BER-based performance monitoring methods can be used independently or can be combined to detect and diagnose faults in a PON. Excessive BER often indicates the early phase of a potential fault in an underlying physical layer, including the optical transceiver and the ODN. Power monitoring can be used to further validate and isolate the problem. For example, it can determine whether the problem is intermittent or persistent, whether the problem is caused by faults in optical transceivers on an OLT or on an ONU, and whether the problem is caused by faults in the ODN. The following fault detection examples are given to describe the performance monitoring system better.

In one example, one of the ONU's transmitters is "stuck" on, which means it continues to transmit power even though no grant is given to the ONU. To detect that this condition is occurring on the PON interface, the system first determines whether the measured OLT receiving power during an idle period is higher than a predetermined threshold, such as signal detect (SD) assert power level (around −29 dB). Excessive received power during idle can be a strong indicator that an ONU laser is "stuck" on. In addition, the system can determine whether there are link de-registrations or whether there are high BER on some links; both can be caused by a "stuck" on ONU laser. After the system determines that a "stuck" on ONU laser is the cause of the fault, the system needs to determine which ONU is the faulty unit by performing fault diagnosis. The system can check the BER statistics of all links and locate the one that has no or low BER; the corresponding ONU is the suspected faulty unit. To further validate, the system can turn off the ONU transmitter physically by sending an OAM message to disconnect a switch for the transmitter, and observe whether all other links recover after the ONU transmitter is off.

In one example, one of the ONU's transmitters is leaking power. To detect this, the system timestamps the ONU's transmission whose measured power is greater than a leak threshold, and determines whether the transmission is within a granted window of the ONU based on the transmission timestamp.

In one example, one ONU has an unstable laser. To detect this, the system continuously measures the ONU's transmitting power and calculates its moving average. In addition, the system calculates the maximum deviation of the measured power from the moving average. If the deviation is outside of a pre-defined range, the ONU laser is unstable.

In one embodiment, the laser of an ONU is aging. To detect such a problem, the system continuously measures the bias current of the laser and compares the measurement result with the laser specification to determine whether aging is occurring. In one embodiment, the OLT maintains a table that includes the initial receiving power value for each coupled ONU, and compares a currently measured receiving power with the saved value. An aging laser often exhibits decreasing power over time.

In one embodiment, the performance of the ONU's receiver is degraded. To detect this, the system continues to measure the ONU receiving power. In addition, the system calculates the link loss, which is the difference between the OLT transmitting power and the ONU receiving power, and compares the link loss with the link budget. If the loss is within the link budget, the system checks the downstream FEC-based BER of the ONU, and determines whether the BER is higher than a predetermined threshold. If so, the ONU's receiver's sensitivity is degrading.

In one embodiment, the PON is experiencing excessive ODN link loss. To detect this, the system continuously measures the OLT receiving power and the ONU transmitting power for all links. In addition, the system calculates real-time link loss and compares it with the link budget. Excessive ODN loss can be caused by bent fibers or loose connectors. A matching PON-ODN topology can be used to cross map the faulty component.

Figure 12:
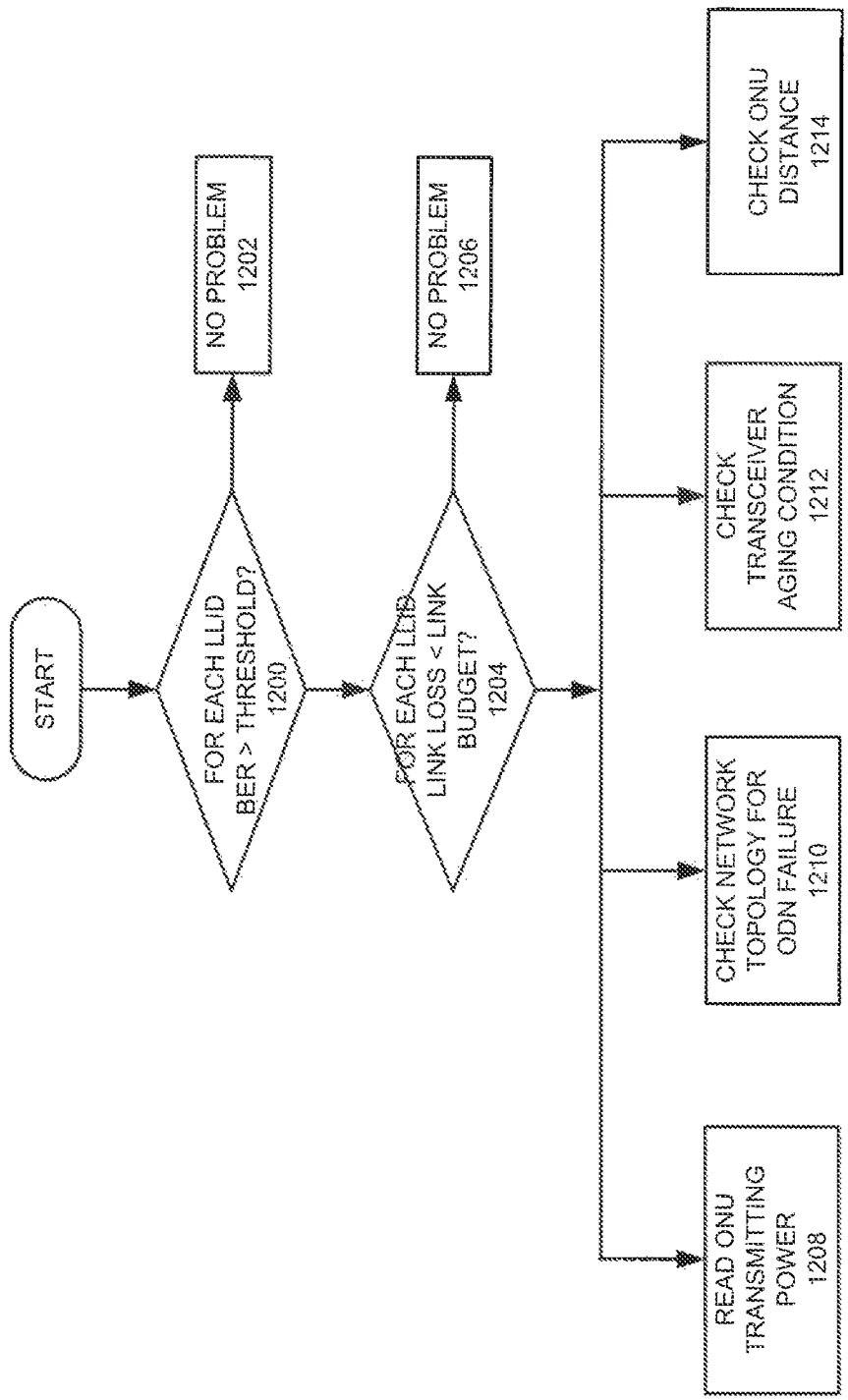
FIG. 12 presents a flow chart illustrating the process of fault detection in accordance with an embodiment of the present invention.

In one embodiment, the system detects excessive BER. To determine the cause of the excessive BER, the system performs a series test. FIG. 12 presents a flow chart illustrating the process of fault detection in accordance with an embodiment of the present invention. During operation, the system determines whether the BER measured for each LLID is greater than a predetermined threshold (operation 1200). If not, the system reports no problem found (operation 1202). If so, the system determines whether the link loss for each LLID is less than a predetermined link budget (operation 1204). If not, the system reports no problem found (operation 1206). If so, the system performs a number of parallel tests. The system reads the transmitting power of the ONUs to determine whether the transmitting power of one of the ONUs is too low (operation 1208). The system checks whether a subset of LLIDs is reporting increased BER, and matches the result with network topology to find potential ODN failure (operation 1210). The system determines whether the performance of any of the transceivers is degrading due to aging (operation 1212). The system also checks the ONU's distance to determine whether any ONU is located too far away (operation 1214).

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. An optical line terminal (OLT), comprising:
    an optical transceiver; and
    a performance-monitoring mechanism configured to:
        generate a logical link identifier (LLID) that is dedicated to performance monitoring,
        grant a transmission window corresponding to the LLID to respective optical network units (ONUs) in a plurality of ONUs,
        assign the LLID to each respective ONU in the plurality of ONUs,
        measure, in turn, optical signals received from the respective ONUs during their respective transmission windows, and
        monitor a performance of the respective ONUs based on the measured optical signals.

2. The OLT of claim 1, wherein each ONU of the respective ONUs comprises:
    a transmitter; and
    a switch, coupled to the transmitter, configured to electrically disconnect the transmitter based on an instruction received from the OLT.

3. The OLT of claim 1, wherein the performance-monitoring mechanism comprises:
    an optical power monitor configured to measure, in turn, optical power of the optical signals received from the respective ONUs.

4. The OLT of claim 1, wherein each of the respective ONUs comprises:
    a forward-error-correction (FEC) mechanism.

5. The OLT of claim 4, wherein the performance-monitoring mechanism is further configured to monitor the performance of the respective ONUs based on FEC statistics associated with the FEC mechanism.

6. The OLT of claim 5, wherein the performance-monitoring mechanism is configured to generate a separate bit sequence to extract the FEC statistics for the respective ONUs.

7. The OLT of claim 1, wherein the performance-monitoring mechanism is further configured to enable a forward-error-correction (FEC) mechanism on the OLT in response to determining that an ONU in the plurality of ONUs is aging.

8. The OLT of claim 1, wherein the LLID is not used for regular data transmissions.

9. The OLT of claim 1, wherein the performance-monitoring mechanism is further configured to:
    measure a transmission power of an ONU in the plurality of ONUs; and
    determine, based on a comparison between the measured transmission power and an ideal transmission power of the ONU, whether the ONU is aging.

10. The OLT of claim 1, wherein the performance-monitoring mechanism is further configured to:
    measure a transmission power of an ONU in the plurality of ONUs; and
    determine, based on a comparison between the measured transmission power and a previously measured transmission power of the ONU, whether the ONU is aging.

11. The OLT of claim 1, wherein the performance-monitoring mechanism is further configured to:
    measure a transmission power of an ONU in the plurality of ONUs; and
    determine, based on the measured transmission power, whether the transmission power is decreasing over time.

12. A method for monitoring a performance of a passive optical network (PON) including an optical line terminal (OLT) and a plurality of optical network units (ONUs), comprising:
    generating a logical link identifier (LLID) that is dedicated to performance monitoring;
    granting a transmission window corresponding to the LLID to respective ONUs in the plurality of ONUs;
    assigning, using the OLT, the LLID to each respective ONU in the plurality of ONUs;
    measuring, in turn, optical power of signals received from the respective ONUs during their respective transmission windows; and
    monitoring the performance of the PON based on the measured optical power.

13. The method of claim 12, wherein the measuring the optical power of the signals comprises:
    monitoring the optical power of the signals within a sampling period arbitrarily aligned within the transmission window.

14. The method of claim 13, wherein the measuring the optical power of the signals comprises:
    monitoring the optical power of the signals beginning at a start time of the sampling period that aligns with a beginning of the transmission window.

15. The method of claim 12, wherein the measuring the optical power of the signals comprises:
    monitoring the optical power of the signals beginning at a start time of the sampling period that aligns with an end of the transmission window.

16. The method of claim 12, further comprising:
    performing forward-error-correction (FEC) to the signals received from the respective ONUs;
    obtaining FEC statistics specific for the respective ONUs; and
    determining respective performances of the respective ONUs based on the FEC statistics.

17. The method of claim 16, further comprising:
    generating a separate bit sequence to extract the FEC statistics.

18. The method of claim 12, further comprising:
    monitoring line coding error statistics to facilitate the performance monitoring.

19. An optical line terminal (OLT) for facilitating performance monitoring in a passive optical network (PON), the OLT comprising:
    an optical transceiver configured to transmit optical signals to and receive optical signals from a plurality of optical network units (ONUs); and
    a performance-monitoring mechanism configured to:
        generate a logical link identifier (LLID) that is dedicated to performance monitoring;
        grant a transmission window corresponding to the LLID to respective ONUs in the plurality of ONUs,
        assign the LLID to each respective ONU in the plurality of ONUs,
        measure idle power from each of the respective ONUs in turn, and determine, based on the measured idle power, whether an ONU in the plurality of ONUs is leaking power.

* * * * *